F. H. VAN HOUTEN.
ROLLER AND BEARINGS THEREFOR.
APPLICATION FILED FEB. 1, 1916.
1,205,063.
Patented Nov. 14, 1916.
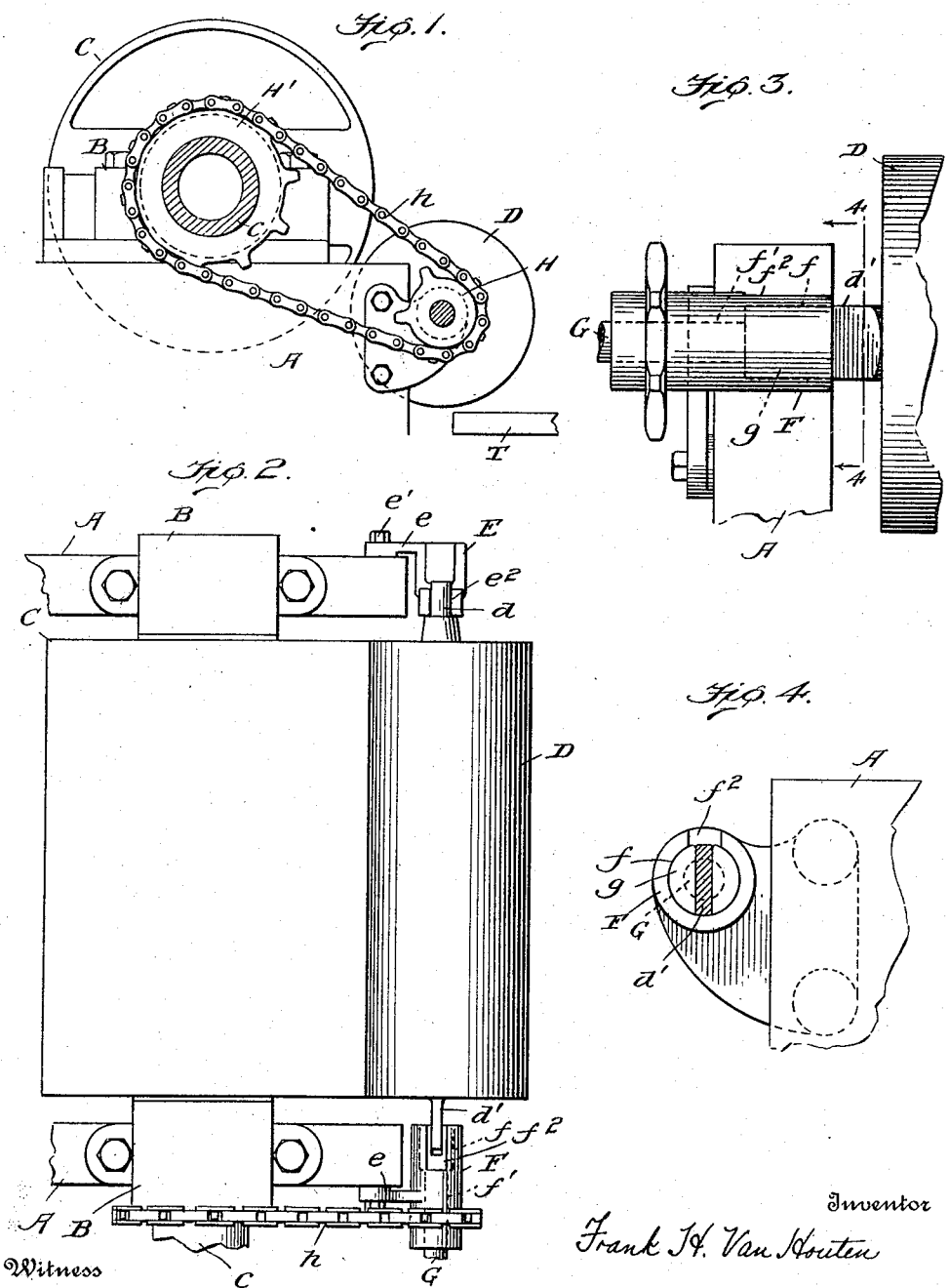

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

ROLLER AND BEARINGS THEREFOR.

1,205,063.

Specification of Letters Patent.

Patented Nov. 14, 1916.

Application filed February 1, 1916. Serial No. 75,533.

*To all whom it may concern:*

Be it known that I, FRANK H. VAN HOUTEN, a citizen of the United States, residing at Beacon, in the county of Dutchess, State of New York, have invented certain new and useful Improvements in Rollers and Bearings Therefor; and I do hereby declare the following to be a full, clear, and exact description of the same, reference being had to the accompanying drawings, forming part of the specification.

The general object of the present invention is to provide an improved roller and bearings therefor whereby the roller may be mounted in the bearings and positively driven through the medium of a drive shaft journaled in one of the bearings and at the same time may be quickly detached from the drive shaft and bearings when desired.

The improved arrangement of the invention is particularly useful in connection with dough dividing machinery and hence, for convenience in description, the present embodiment is a take-off roller for receiving the batches of dough discharged from the pockets of a measuring head or cylinder, such, for example, as is described in my prior Patent No. 1,158,339, granted to me October 26, 1915. It will be understood, however, that the invention is not limited to the specific application herein described, but on the contrary is of general utility.

The invention consists in the construction, arrangement and combination of parts hereinafter set forth, and the novel features of the invention will be particularly pointed out and specified in the claims at the end of the specification.

In the drawings: Figure 1 is a side elevation, partly in section, of a portion of the frame of a dough dividing machine illustrating the measuring cylinder and a take-off roller and bearings equipped with the present improvements. Fig. 2 is a top plan view of the same. Fig. 3 is an enlarged detail front view of the take-off roller and the bearing at the driving end. Fig. 4 is a transverse section taken on the line 4—4 of Fig. 3, looking in the direction of the arrow.

Like characters of reference in the several figures indicate the same parts.

The frame of a dough dividing machine is indicated in the accompanying drawings by the letter A and is provided with suitable bearing brackets B in which is journaled the shaft $c$ of a measuring cylinder or head C. The measuring cylinder C is provided with pockets adapted to receive batches of dough, the said pockets being provided with plungers which are retracted when the pockets are in one position and advanced when said pockets are in another position, to discharge the measured batches of dough. The foregoing system of operation has been fully described in my prior Patent No. 1,158,339, and other prior patents granted to me, and hence needs no further description here.

At the discharge side of the measuring cylinder C is a take-off roller D on which the discharged batches of dough are deposited and fed by the movement of the take-off roller to a table or other support T for further manipulation. The take-off roller D is driven in accord with the intermittent rotary movement of the measuring cylinder and the feature of the invention lies in the construction of the roller and its bearings whereby the roller may be quickly detached from its bearings when desired, and at the same time the positive drive of the roller will be preserved when the roller is mounted in its bearings. At one end the roller is equipped with a spindle $d$ of ordinary construction. The spindle $d'$ at the other end of said roller D is flattened, as shown, whereby it may form one member of a driving connection with a drive shaft, the construction of which will be hereinafter set forth.

The bearing E opposite the driving end of the roller D is provided with a suitable bracket $e$ whereby it may be fixed to the frame A of the machine in any preferred way, such as a screw $e'$. The upper side of bearing E is formed with a slot $e^2$ of sufficient width to receive the spindle $d$ of the take-off roller D. At the driving end of said roller D a bearing F is secured to the frame A by means of a similar bracket $e$, and said bearing F is formed with two connecting bearing sockets $f$, $f'$, the socket $f$, adjacent or facing the roller D, when in position, being of greater diameter than the socket $f'$. A drive shaft G is provided with a head $g$, which is received within the socket $f$ of greater diameter. The head $g$ serves to resist the end thrust of the roller D on the drive shaft G, thereby preventing the drive shaft from being displaced endwise in its bearing. The main portion of the drive shaft is journaled in the bearing socket $f'$. Bearing F is also formed on its upper side with a slot $f^2$, the slot, however, being of lesser width than the greater transverse dimension of the flattened end of spindle $d'$, and of slightly greater width than the lesser transverse dimension of said flattened end, so that the flattened end of spindle $d'$ may not be removed from the bearing F unless its wider sides are substantially parallel with the sides of the slot $f^2$, as shown in Fig. 4. In all other positions the spindle $d'$ of the take-off roller is locked in its bearing F. The head $g$ of drive shaft G is bifurcated, as shown, to provide a construction whereby the flattened end of spindle $d'$ may be interlocked with said drive shaft in the bearing F. Intermittent motion may be applied to shaft G by a sprocket H having a chain connection $h$ with a sprocket H' on the shaft $c$ of the cylinder C, thereby causing the take-off roller to rotate in accord with the rotation of the cylinder.

With the above construction the take-off roller D may be readily mounted and dismounted from engagement with drive shaft G and its bearings by rotating the drive shaft to such position that the inner sides of the bifurcations at the end of the head $g$ are parallel with the sides of slot $f^2$. When so positioned the spindles at the opposite ends of the take-off roller may be easily lifted out of their respective bearings; in all other positions the roller is locked in its bearings.

The above construction is exceedingly simple and inexpensive to manufacture, and at the same time permitting quick mounting and dismounting of the roller. In addition the roller will be positively connected with the drive shaft, when mounted in its bearings, so as to receive the necessary rotary movement in accord with the intermittent rotation of the cylinder C.

It will be obvious that although the present aplication of the invention is of great utility, the invention will not be strictly limited to the hereindescribed construction and application, but may serve its purpose with equal utility in machines of other types.

What is claimed is:—

1. The combination with a support, of a roller such as described having a spindle projecting from each end thereof, a pair of spaced bearings mounted on said support and adapted respectively to receive the projecting spindles of the roller, a drive shaft journaled in one of said bearings and having its end formed for detachable driving engagement with the corresponding spindle of the roller, and a slot in the upper side of each of the bearings, whereby the roller may be mounted and dismounted by passing its spindles through the slots in the upper sides of the bearings.

2. The combination with a support, of a roller such as described having a spindle projecting from each end thereof, a pair of spaced bearings mounted on said support and adapted respectively to receive the projecting spindles of the roller, a drive shaft journaled in one of said bearings and having a bifurcated end, one of said spindles being formed to interlock with the bifurcated end of the drive shaft, and a slot in the upper side of each of the bearings, whereby the roller may be mounted and dismounted by passing its spindles through the slots in the upper sides of the bearings.

3. The combination with a support, of a roller such as described having a spindle projecting from each end thereof, a pair of spaced bearings mounted on said support and adapted respectively to receive the projecting spindles of the roller, a drive shaft journaled in one of said bearings and having a bifurcated end, one of said spindles being formed with a flattened end adapted to fit between the bifurcations at the end of the drive shaft, and a slot in the upper side of each of the bearings through which the spindles of the roller may be passed, the slot in the bearing at the driving end being of greater width than the lesser transverse dimension of the flattened end of the spindle but of lesser width than the greater transverse dimension of said flattened end.

4. The combination with a support, of a roller, such as described, having a spindle projecting from each end thereof, a pair of spaced bearings mounted on said support and adapted respectively to receive the projecting spindles of the roller, a drive shaft having a head formed with a bifurcated end, one of said bearings having two bearing sockets, one socket being a continuation of and greater in diameter than the other to receive the shaft and its head, one of said spindles being formed with a flattened end adapted to fit between the bifurcations at the end of the drive shaft, and a slot in the upper side of each of the bearings through which the spindles of the roller may be passed, the slot in the bearing at the driving end being of greater width than the lesser transverse dimension of the flattened end of the spindle but of lesser width than the greater transverse dimension of said flattened end.

FRANK H. VAN HOUTEN.